Aug. 8, 1967  N. T. BRINT  3,334,418
SIGHTING DEVICES

Filed July 14, 1965  3 Sheets-Sheet 1

Norman Trevor Brint
*Inventor*

By Cushman, Darby & Cushman
*Attorneys*

Aug. 8, 1967  N. T. BRINT  3,334,418
SIGHTING DEVICES
Filed July 14, 1965  3 Sheets-Sheet 2
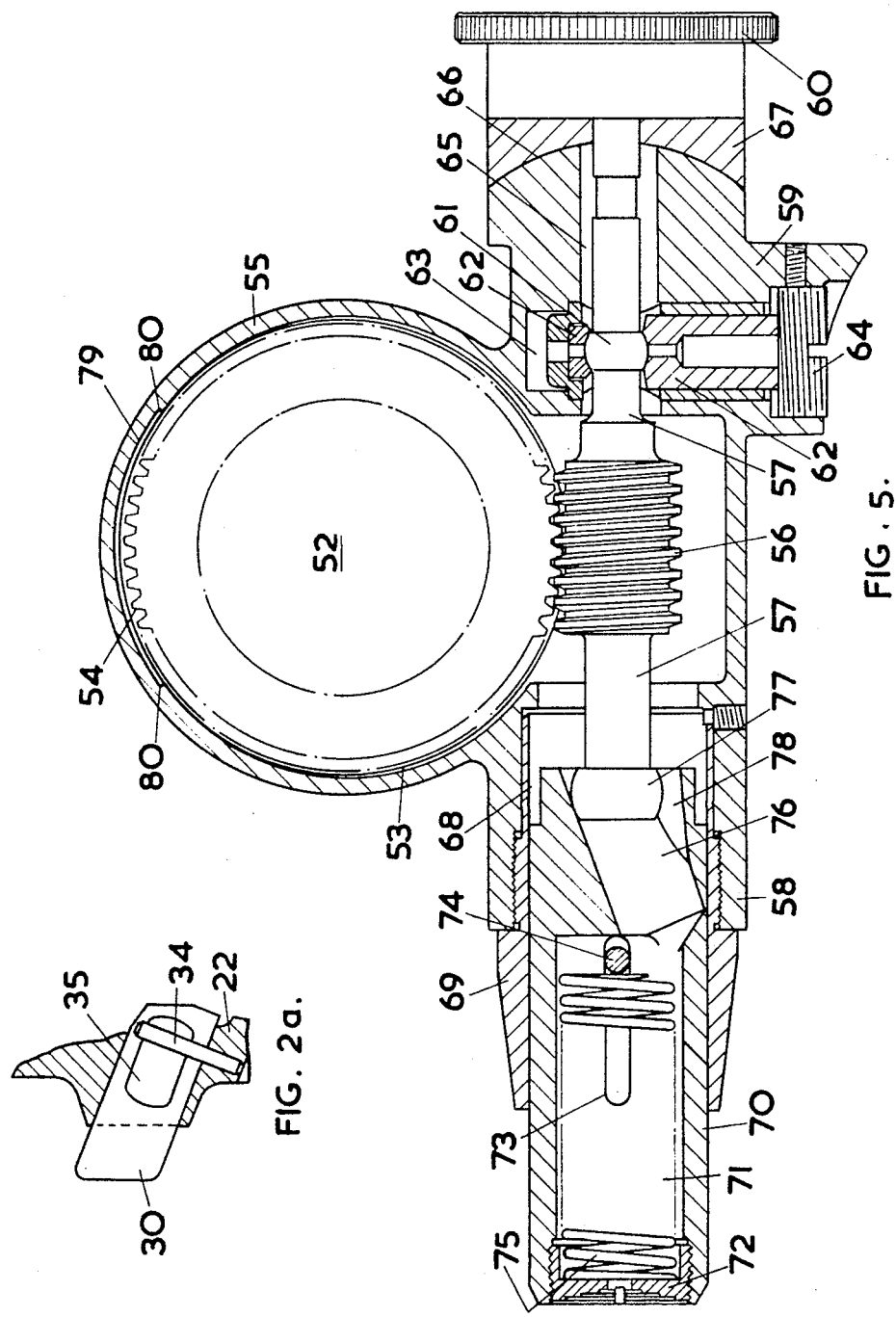
Norman Trevor Brint
Inventor
By
Cushman, Darby & Cushman
Attorney United States Patent Office 3,334,418
Patented Aug. 8, 1967

3,334,418
SIGHTING DEVICES
Norman Trevor Brint, Waltham Abbey, Essex, England, assignor to Secretary of State for Defence in Her Britannic Majesty's Government of the United Kingdom of Great Britain and Northern Ireland, London, England
Filed July 14, 1965, Ser. No. 471,896
18 Claims. (Cl. 33—50)

This invention relates to sighting devices and is particularly concerned with mountings or carriers for such devices on guns or in surveying or other optical apparatus.

In such apparatus, means is often provided for rotating the sighting instrument relative to its mounting either about an axis perpendicular to the line of sight for adjusting the instrument in azimuth or elevation, or about its own axis, for example, to adjust the position of the graticule with which the instrument is normally fitted, when the gun or other apparatus is sited on sloping or uneven ground. One such means comprises a worm wheel mounted on the sighting instrument or its housing and rotatable therewith by means of a worm upon a transverse shaft carried by the mounting. One such arrangement is known in which the worm shaft has a ball mounting near one end, the worm being urged into engagement with the worm wheel by a spring which acts on the shaft in a direction substantially perpendicular thereto. This arrangement allows the shaft to move sufficiently to take up irregularities in the worm wheel teeth and may allow the worm to be disengaged for rapid, large adjustments of the worm wheel. It has, however, the disadvantage that the worm may become disengaged inadvertently, for example by vibration such as would be caused by firing a gun on which the device is mounted or by dirt accumulated in the worm wheel teeth, and so allow the sighting instrument to move out of adjustment.

The present invention overcomes this disadvantage and comprises a sighting device which includes a rotatable portion incorporating a sighting instrument, a mounting for said rotatable portion and a rotary adjustment for said rotatable portion comprising a worm wheel rotatable therewith and a co-acting worm upon a shaft carried by the mounting, which shaft is pivoted to swing about an axis parallel to that of the worm wheel to disengage the worm from the worm wheel, the worm being urged into engagement with the worm wheel by a spring pressed wedge member acting between the worm shaft and a portion of the mounting, there also being provided means for moving the wedge member against its spring to release the shaft.

The worm may be centrally located on the shaft which is pivoted near one end, for example in a ball mounting, with the wedge member acting at the end of the shaft remote from the pivot. The wedge member may act between the shaft and a surface which may be either inclined to or parallel to the axis of the shaft. A convenient form of wedge member consists of a plunger carried in a guideway in the mounting of the sighting instrument. In one such arrangement the guideway for the plunger is so directed that its axis is inclined to the axis of the worm shaft and lies in the plane of the worm wheel, the plunger having therein a small bore coaxial with the shaft and into which the shaft extends. The portion of the plunger on the side of the shaft remote from the worm wheel constitutes a wedge acting between the shaft and the guideway. The wedge spring may act between shaft and plunger within the bore or may act between the plunger and a suitable fixed part of the mounting. Alternatively the guideway may be coaxial with the shaft one end of which is seated in a bore in the plunger the axis of which bore is inclined to that of the shaft.

When extreme accuracy is required as in a gun sight the worm wheel mechanism has a further disadvantage when the rotary member is mounted, as is usually the case, in a simple cylindrical bearing. When wear has occurred which permits some play in the bearing, the initial movement of the worm produces, not a pure rotation of the rotary member about its axis, but a rolling motion within the bearing whereby, in addition to rotation, there occurs a slight lateral displacement of the axis of the rotary member. A similar motion occurs at each reversal of the direction of rotation. Such a motion of the rotary member is obviously undesirable and is eliminated by a further feature of this invention which provides that a cylindrical bearing surface on the rotary member is mounted in a bearing with which it is in contact at only two angular points of its circumference, a third bearing point being provided by the engagement between the worm and the worm wheel. The two positions of contact between rotary member and bearing are angularly spaced by more than 90° from the point of engagement with the worm and are preferably symmetrically disposed one on either side of that diameter of the bearing surface which passes through the worm. With this arrangement, the spring pressed wedge member not only urges the worm into engagement with the worm wheel but also urges the bearing surface into contact with the bearing and eliminates the aforesaid rolling motion.

When a sighting device is attached to a gun, it is required to "zero" the axis of the sighting instrument (e.g. a telescope) at an angle to the axis of the gun barrel to allow for the offset between instrument and barrel. Preferably this initial setting should also allow for certain inherent characteristic errors which are individual to each particular weapon and also for manufacturing variations which may affect the relative positions of the two axes when the sighting device is fitted to the gun. This may necessitate individual "zeroing" of the telescope for each particular weapon, a process which is best carried out by adjustment after fitting the sighting device. Similar adjustments may, of course, be applied to telescopes for other optical instruments.

One form of the invention, therefore, includes in addition to the rotary adjustment, means for adjusting the angular position of the axis of the sighting instrument relative to the mounting.

Such adjustment may be provided for by mounting the sighting instrument in a universal joint and providing means for deflecting the instrument about the joint, in each of two planes which are preferably, though not essentially, perpendicular. One effective deflecting means comprises two sliding cam mechanisms one of which is arranged to deflect the instrument in elevation the other being arranged to deflect it in azimuth.

Certain arrangements in accordance with the invention, in connection with gun-sights, will now be more particularly described, by way of example only, with reference to the accompanying drawings in which:

FIG. 2a is a detail of a plunger shown in FIG. 2,

FIG. 5 is a transverse section, similar to FIG. 2, of a modified arrangement.

Figure 1:
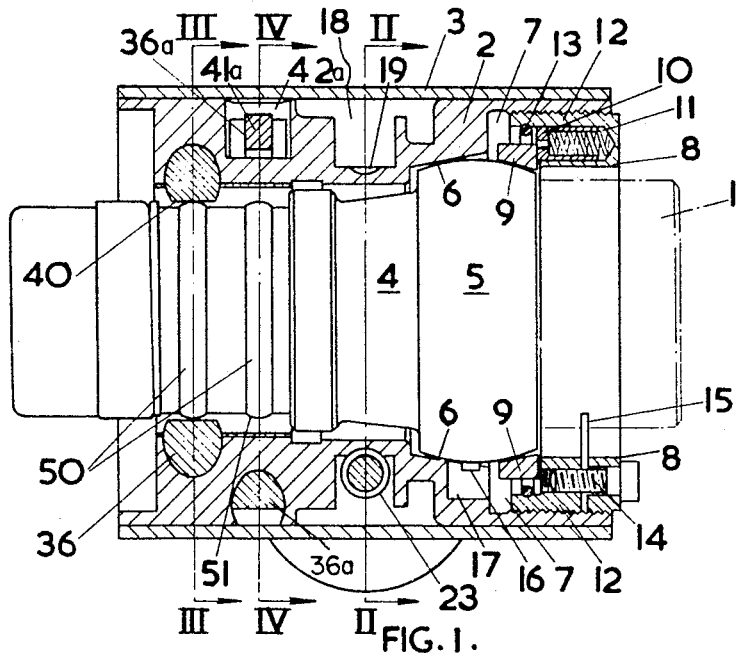
FIG. 1 is a longitudinal section of a mounting for a sighting telescope.
Figure 2:
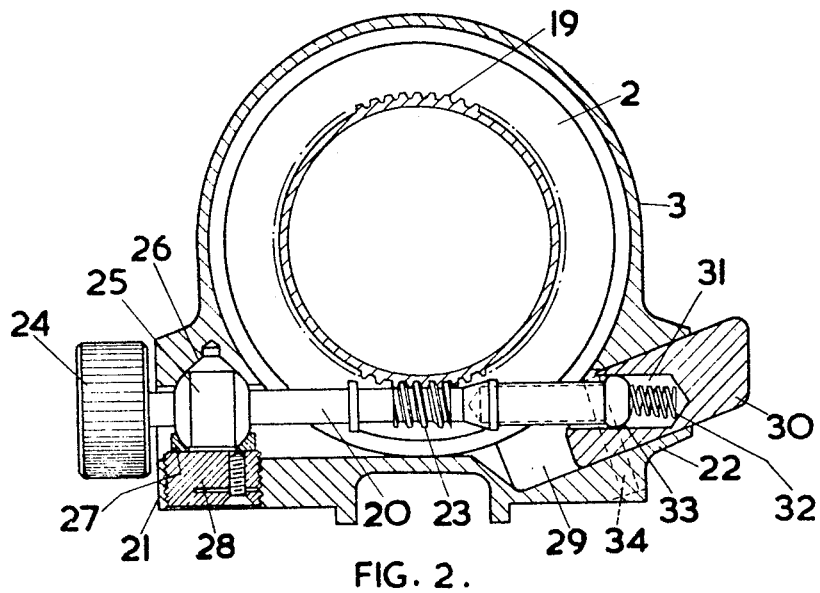
FIG. 2 is a transverse section on the line II—II of FIG. 1.

The device shown in FIGS. 1 to 4 comprises, essentially, a sighting telescope 1 ball mounted in a carrier 2 which is axially rotatable within a cylindrical casing 3 and is provided with a worm mechanism (FIG. 2) for rotary adjustment of the carrier 2 within the casing 3 and with a pair of sliding cam mechanisms (FIGS. 3 and 4) for angular adjustment of the telescope axis relative to the axis of the carrier.

The telescope 1 is fitted into a housing 4 whose outer contour is designed to meet the requirements of the carrier 2 as will be hereinafter described, and which is located in an axial bore in the carrier 2. On the rearward end of the housing 4 is formed a part spherical surface 5 which constitutes the ball portion of the ball mounting and is seated forward of its greatest diameter, in a conical counterbore 6 near the rearward end of the carrier 2. Rearward of the conical counterbore, the carrier has a larger diameter, cylindrical, internally threaded counterbore 7, into which is screwed a retaining ring 8. A conically bored, floating collar 9 is seated on the part spherical surface 5 of the telescope housing 4, rearward of its greatest diameter and pressed into contact therewith by a number of spring loaded ferrules 10 located in longitudinal bores 11 in the forward side of the retaining ring 8.

The retaining ring 8 has a cylindrical flange 12 extending from its forward end and a circular spring clip 13, sprung into a groove in the inner surface of this flange, serves to hold the spring loaded ferrules 10 in position before assembly of the retaining ring 8 into the carrier 2. The retaining ring 8 is locked in position by a longitudinal screw 14 located across a sawcut 15. This arrangement ensures uniform loading of the ball joint 5, 6, 9 with compensation for wear. Relative rotation of telescope housing 4 and carrier 2 is prevented by a small key 16 on the part spherical surface and engaged in a keyway 17 in the carrier 2.

Forward of the ball mounting, the carrier 2 is formed with a deep circumferential groove 18 in its outer surface the base of which groove is formed with gear teeth 19 to constitute the worm wheel of the rotary adjustment. Extending across the lower part of the circumferential groove 18 and tangential to the worm wheel is a worm shaft 20, mounted in a pair of bosses 21, 22 formed on the cylindrical casing 3. This shaft 20 carries a worm 23, which is normally in engagement with the worm wheel 19, and, at one end outside the casing 3, a hand operated wheel 24. Within the boss 21 adjacent the hand wheel 24 the shaft 20 carries a partly spherical enlargement 25 engaged between a conical seating 26 in the boss 21 above the shaft 20 and the conical bore of a collar 27 below the shaft, the collar 27 being retained by a locked plug 28 screwed into the lower part of the boss 21, the whole arrangement constituting a ball joint about which the worm shaft 20 can be deflected. The boss 22 remote from the handwheel 24 has therein a bore 29 whose axis is inclined downwardly and inwardly to intersect the axis of the worm shaft 20 and lies in the plane of the worm wheel 19. Within this bore 29 is a plunger 30 having at its inner end a small bore 31 coaxial with the worm shaft 20 for which it forms a bearing and into which the end of the worm shaft extends. A spring 32, in compression, extends from the closed end of the small bore 31 into the worm shaft 20 which, for part of its length, is tubular. The end of the shaft within the small bore 31 carries a small, part spherical flange 33 to facilitate relative rotation between shaft 20 and plunger 30 about an axis perpendicular to that of the shaft 20. Inward depression of the plunger 30 will compress the spring 32 and carry the contained end of the worm shaft 20 downward, rotating the shaft about the ball joint, 25, 26, 27 to disengage the worm 23 from the worm wheel 19 to permit large, rapid manual rotation of the carrier 2 and telescope 1. Release of the plunger 30 allows the spring 32 to force it outward and upward to re-engage the worm and the worm wheel. The stroke of the plunger 30 is limited as shown in FIG. 2a by a pin 34, inserted in the boss 22 and engaging in a cutaway slot 35 on one side of the plunger 30. With this arrangement, inadvertent disengagement of worm 23 and worm wheel 19 due to forces acting perpendicularly to the worm shaft 20 becomes virtually impossible owing to the wedge action of the plunger 30 acting between its bore 29 and the worm shaft 20. For a simple wedge, disengagement by such forces would only be possible if the angle between the axes of plunger 30 and shaft 20 exceeded the angle of friction ($\tan^{-1}\mu$). In the present arrangement the angle between the axes can be considerably increased since the frictional wedge action is assisted by the spring and also by a second frictional force between the flange 33 of the shaft 20 and the surface of the small bore 31.

Figure 3:
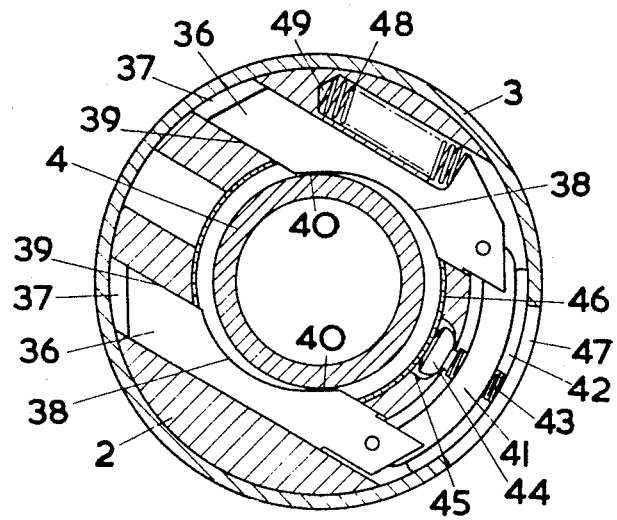
FIG. 3 is a transverse section on the line III—III of FIG. 1.
Figure 4:
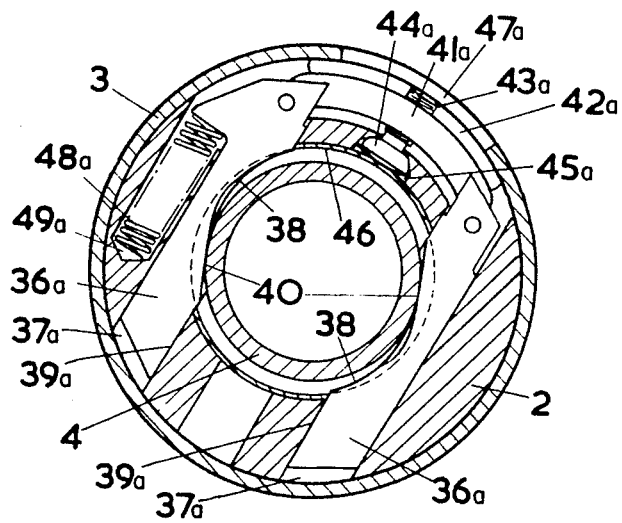
FIG. 4 is a transverse section on the line IV—IV of FIG. 1.

Deflection of the telescope 1 about its ball mounting 5, 6, 9 is achieved by means of two identical, sliding cam mechanisms FIGS. 1, 3 and 4 mounted in the carrier 2, longitudinally spaced from one another and forward of the rotary adjustment, the two mechanisms being arranged to operate in two diametral directions perpendicular to one another. Identical parts of the mechanisms shown in FIGURES 3 and 4 are indicated by the addition, in FIGURE 4 which will not be separately described, of the suffix $a$ to the corresponding numerals used in FIGURE 3. The mechanism of FIGURE 3 comprises a pair of cylindrical cam plungers 36 located in parallel, transverse guide bores 37 in the carrier 2, one on either side of the telescope housing 4. The guide bores 37 intersect the bore of the carrier 2 and the two cam plungers 36 of each pair have cutaway portions 38 on the two adjacent faces 39 to accommodate the telescope housing 4. Each cutaway portion 38 has an area of plane surface engaging the telescope housing tangentially and constituting a cam face 40 on the plunger, the remainder of the cutaway portion 38 being a curved surface lying clear of the housing 4. The cam faces 40 of the two plungers 36 are parallel and inclined to the axes of the plungers so that movement of the plungers 36, in unison, in the guide bores 37 deflects the telescope housing 4 at right angles to the cam faces 40. Since the two mechanisms operate at right angles, movement imposed upon the housing by one mechanism causes the housing 4 to slide along the cam faces 40 of the second mechanism.

The two cam plungers 36 of each mechanism are connected at one end by a lever 41 pivoted to each and lying in a slot 42 in the outer surface of the carrier 2. An adjusting screw 43 extends through the centre of each lever 41, radially relative to the carrier 2 and has at its inner end a head 44, whose contact surfaces are part spherical, held captive in a seating 45 formed in the inner surface of the carrier bore by means of a liner 46 inserted in the said bore. The screw 43 may be adjusted, through a slot 47 in the surrounding casing 3, to move the lever 41 and, consequently, both plungers 36 in unison, parallel to the guide bores 37 to deflect the telescope. A spring 48, located in a recess 49 in the carrier 2 biases one plunger of the pair toward the lever 41 thus tending to tilt the lever 41 in order to move the cam faces 40 towards one another to exert a constant clamping action on the telescope housing 4 and take up any wear which may occur. The telescope housing 4 contacts each pair of plungers 36 through a flange 50 integral with the housing 4 and having a part spherical surface 51 to facilitate the slight rotary movement which occurs during deflection. This arrangement of spring loaded cam plungers 36 connected by levers 41 maintains a balanced clamping during adjustment and the use of two pairs operating at right angles ensures positive clamping after adjustment.

It will be noted that while the deflection adjustments are performed upon the telescope housing 4, relative to the carrier 2; the rotary adjustment is performed upon the carrier 2, relative to the casing 3. Thus, once the deflection of the telescope has been adjusted, the rotary adjustment causes the telescope axis to precess about that of the carrier. When the weapon is sited on sloping or uneven ground, rotary adjustment to restore verticality of the telescope graticule will therefore involve the aforementioned precession. This provides a more accurate adjustment than would mere rotation of the telescope about its own axis in that it tends to preserve the correlation in the vertical sense, between the axis of gun and telescope.

The device shown in FIG. 5 includes a sighting instrument 52, not described in detail, which may be a form of the well known dial sight but could equally well be a telescope or any other form of sight in which rotary adjustment is required. The instrument is enclosed in a suitable housing which has formed thereon, or attached thereto, a cylindrical bearing surface 53 and a worm wheel 54 both of whose axes are coincident with the required axis of rotation of the instrument. The aforesaid bearing surface 53 is fitted into a corresponding bearing 55 formed in a mounting or casing which can be attached to the gun. A worm 56 normally in engagement with the worm wheel 54, is carried by a worm shaft 57 arranged tangentially to the worm wheel 54 and mounted in a pair of bosses 58, 59 formed on the casing 55 and located one on each side of the worm 56. One end of the worm shaft 57 extends through its boss 59 and carries, externally of the casing 55, a hand wheel 60. Within this boss 59, the shaft 57 has formed thereon, a partly spherical enlargement 61 engaged between a pair of conical seatings 62 fitted into a transverse bore 63 of the boss 59 one on either side of the shaft 57 and retained in said bore 63 by a locked screwplug 64, the axis of the seatings being perpendicular to that of the shaft 57. This arrangement constitutes a ball joint about which the shaft 57 can swing to disengage the worm 56 from the worm wheel 54, the bore 65 of the boss 59 through which the shaft 57 passes being somewhat enlarged to permit such movement. The conical seating 62 on the side of the shaft adjacent to worm wheel 54 is preferably allowed to float in a slightly oversize recess, an arrangement which enables the seating 62 to align itself with the spherical enlargement 61 of the shaft 57. The outer end face 66 of this boss 59 is formed as part of a cylinder and is engaged by a mating cylindrical surface on a washer 67 inserted between the boss 59 and the hand wheel 60 the common axis of the cylindrical surfaces passing through the ball joint 61, 62, parallel to the axis of the worm wheel 54. This arrangement forms a useful seal against ingress of dirt without hampering the swinging movement.

The boss 58 remote from the handwheel 60 has a bore 68 of considerably larger diameter than the worm shaft 57 with which it is coaxial. A sleeve 69, screwed into this bore, carries a plunger 70 whose outer end extends beyond the sleeve 69, externally of the casing 55 to form a press button. A coaxial bore 71 extends from the outer end of the plunger 70 for about two thirds of its length and its outer end is closed by a screw plug 72. A longitudinal slot 73 is formed in the plunger 70 and extends from the inner end of the coaxial bore 71 outwardly for about half its length. A pin 74 carried by the sleeve 69 extends through the slot 73 and transversely across the bore 71 and a spring 75 in compression, extends between the pin 74 and the closure plug 72. This spring 75 urges the plunger 70 outward so that the pin 74 normally engages the inner end of the slot 73 but the plunger 70 can be pressed inwardly against the spring 75 until the pin 74 engages the outer end of the slot 73. The pin 74 thus performs the dual function of preventing withdrawal of the plunger 70 from the sleeve 69 and providing an abutment for the inner end of the spring 75. The inner end of the plunger 70 has formed therein a smaller inclined bore 76 whose axis intersects that of the worm shaft 57 and lies in the plane of the worm wheel 54 and is directed toward the worm wheel. In this inclined bore 76 is seated a ball enlargement 77 carried by the end of the worm shaft 57 remote from the hand wheel 60. Inward movement of the plunger 70 causes the end of the shaft 57 to move relative to the inclined bore 76, to swing the shaft away from the worm wheel 54 by pivoting about its ball joint 61, 62. To avoid jamming between the shaft 57 and that part of the plunger 70 on the side thereof remote from the worm wheel 54 a groove 78 is cut in the appropriate side of the inclined bore 76 to provide a keyhole cross section, the groove portion 78 of which is wide enough to accommodate the worm shaft 57 but too narrow to accept the ball enlargement 77. The plunger 70 thus constitutes a spring pressed wedge which normally urges the worm 56 into engagement with the worm wheel 54 but which can be pressed inwardly against its spring to positively disengage the worm from the worm wheel. Owing to the wedge action it is virtually impossible for the worm 56 to be disengaged inadvertently by forces acting perpendicularly to the worm shaft 57.

The above arrangement may, of course, be incorporated as previously described, with a plain-cylindrical bearing but, where extreme accuracy is required the following arrangement is preferred. The bearing 55 has a bore of slightly larger diameter than the bearing surface 53 it accommodates. A wide longitudinal groove 79 is formed in the inner surface of the bearing 55, the centre line of the groove being diametrically opposite the worm 56. The width and depth of the groove 79 are such that the bearing surface 53 can rest in contact with the shoulders 80 formed at the edges of the groove 79 without touching the bearing 55 at any other point. The shoulders 80 are preferably rounded to enable the bearing surface 53 to rotate without jamming. The bearing surface 53 thus makes line contact with the bearing 55 at each of the above shoulders 80, its third suspension point being constituted by its engagement with the worm 56. The spring pressed plunger 70 thus urges the worm 56 into engagement with the worm wheel 54 and the pressure applied thereto by the worm 56, in turn, urges the bearing surface 53 into contact with shoulders 80 so that the aforementioned undesirable rolling motion is eliminated. The width of the groove 79 is by no means critical though it will be obvious that extremes in either direction are undesirable. It has been found that good results are obtained with a groove whose width subtends an angle of about 80° at the axis of the bearing 55.

It will be clear that many modifications are possible in the above bearing arrangement while still obtaining the desired result, the only essential being two line contact between bearing surface and bearing. Provided this is achieved the bearing may have any general shape. The contact need not be along fixed shoulders or ribs, which could be replaced by rollers or lines of ball bearings inserted in the inner surface of the bearing member. The result could also be achieved by the use of a bearing having a slightly elliptical bore, the bearing surface being maintained cylindrical in form. It will also be clear that the bearing arrangement just described could be equally well applied to the arrangement shown in FIGS. 1 to 4 and that the devices shown in FIGS. 3 and 4 could be used in conjunction with either of the rotary mechanisms shown in FIGS. 2 and 5.

It will be appreciated that many modifications may be made to the above, particularly described, devices, within the scope of the invention. The relative positions of the various adjustments and the ball mountings may be altered to suit various weapons or to comply with manufacturing requirements. It will also be obvious that the design details are open to wide variations. For weapons having less stringent accuracy requirements the rotary adjustment may be used alone or with other less accurate types of adjustment for deflection. The casing may, of course be attached to the weapon by any suitable means.

It will be also appreciated that a device such as described herein may be used in conjunction with the sighting telescope of any optical device, e.g. a theodolite, wherein such adjustments are necessary or desirable.

I claim:

1. A sighting device including a rotatable unit incorporating a sighting instrument; a mounting for said rotatable unit; and a rotary adjustment for said rotatable unit comprising a worm wheel rotatable with the unit, a worm shaft carried by the mounting and pivoted to swing about an axis parallel to that of the worm wheel, a worm upon said shaft coacting with the worm wheel and disengageable therefrom by the pivotal movement of the shaft, a spring pressed wedge member engaging the worm shaft and a portion of the mounting to wedge the worm into engagement with the worm wheel, so that forces acting perpendicularly to said worm shaft will not, normally, displace said worm shaft and disengage the worm and worm wheel and means for displacing the wedge member against its spring to release the shaft.

2. A sighting device as claimed in claim 1 wherein the means for displacing the wedge member against its spring comprises a plunger carried in a guideway in the mounting.

3. A sighting device as claimed in claim 1 wherein the mounting incorporates a surface inclined obliquely to the axis of the worm shaft, the wedge member acting upon the worm shaft and said surface.

4. A sighting device as claimed in claim 1 wherein the wedge member comprises a spring pressed plunger carried in a guideway in the mounting, the axis of said guideway being inclined obliquely to that of the worm shaft, one end of which shaft is seated in a bore, coaxial therewith, formed in the plunger, the plunger being movable against its spring to disengage the worm from the worm wheel.

5. A sighting device as claimed in claim 1 wherein the mounting incorporates a surface parallel to the axis of the worm shaft, the wedge member acting upon the worm shaft and said surface.

6. A sighting device as claimed in claim 1 wherein the wedge member comprises a spring pressed plunger carried in a guideway in the mounting coaxial with the worm shaft one end of which shaft is seated in a bore in the plunger the axis of which bore is inclined obliquely to that of said shaft; the plunger being movable against its spring to disengage the worm from the worm wheel.

7. A sighting device as claimed in claim 1 wherein the mounting includes a bearing for the rotatable unit said bearing having an inner surface which makes contact with the rotatable unit at only two angular positions, a third support for the rotatable unit being provided by the engagement between the worm and the worm wheel.

8. A sighting device as claimed in claim 7 wherein the bearing has a pair of longitudinal shoulders constituted by the edges of a longitudinal groove formed in its inner surface, which shoulders define the two angular positions of contact with the rotatable unit.

9. A sighting device as claimed in claim 1 having an additional adjustment means constructed and arranged for turning the sighting instrument about at least one axis perpendicular to its line of sight to adjust the line of sight.

10. A sighting device as claimed in claim 9 wherein the rotatable unit has a carrier for the sighting instrument and a ball mounting through which the sighting instrument is mounted in the carrier; the additional adjustment mechanism being arranged to turn the sighting instrument about at least one transverse axis through the ball mounting.

11. A sighting device as claimed in claim 9 wherein the rotatable unit has a carrier for the sighting instrument; a ball mounting through which the sighting instrument is mounted in the carrier; and a pair of sliding cam arrangements mounted in the carrier, said cam arrangements constituting the said additional adjustment mechanism and each being operable upon the sighting instrument to turn it about one or other, respectively, of two perpendicular transverse axes through the ball mounting whereby the line of sight is adjustable in any desired plane.

12. A sighting device as claimed in claim 11 wherein each sliding cam arrangement comprises two cam plungers slidably mounted in parallel guideways in the carrier one either side of the sighting instrument; a cam face on each plunger inclined to its axis, each of which cam faces engages the sighting instrument; and means for moving the plungers along the guideways to turn the sighting instrument about the ball mounting by the action thereon of the cam faces.

13. A sighting device as claimed in claim 12 having, in each sliding cam arrangement, a lever linking the two cam plungers and pivoted to one end of each; means for moving the lever in a direction parallel to the axes of the plungers to move the plungers in unison along their guideways; and a spring acting upon one of the plungers to bias the arrangement whereby a clamping action is applied by the cam faces to the sighting instrument.

14. A sighting device comprising a casing in which is formed a cylindrical bore; a carrier rotatably mounted in said bore; a sighting instrument mounted in said carrier and rotatable therewith and a rotary adjustment for the carrier and sighting instrument comprising a worm wheel coaxial with, and rotatable with, the carrier; a worm shaft mounted in the casing and tangential to the worm wheel; a worm carried at an intermediate point of the worm shaft and cooperative with the worm wheel; a ball formed on the worm shaft near one end thereof and mounted in a socket formed in the casing, about which ball the shaft can swing to disengage the worm from the worm wheel; a plunger slidably mounted in a guideway in the casing, the axis of which guideway intersects the worm shaft obliquely and is coplanar with the worm wheel, in which plunger is formed a bore coaxial with the worm shaft and into which extends that end of the worm shaft remote from the ball, whereby inward movement of the plunger into the casing is operative to disengage the worm from the worm wheel; and a spring coaxially contained partly in the bore of the plunger and partly in a recess in the end of the shaft which extends into said bore, which spring is in compression between shaft and plunger to urge the plunger outwardly of the casing whereby the worm is urged into engagement with the worm wheel by wedge action of that portion of the plunger lying between the worm shaft and the surface of the guideway remote from the worm wheel.

15. A sighting device as claimed in claim 14 having a pair of longitudinal shoulders constituted by the edges of a longitudinal groove formed in the inner surface of the bore in the casing in which the carrier is mounted, the carrier being of slightly smaller diameter than said bore whereby it makes contact with the bore only along said shoulders, a third support being provided by the engagement between worm and worm wheel.

16. A sighting device comprising a casing in which is formed a cylindrical bore; a carrier rotatably mounted in said bore; a sighting instrument mounted in said carrier and rotatable therewith and a rotary adjustment for the carrier and sighting instrument comprising a worm wheel coaxial with, and rotatable with, the carrier; a worm shaft mounted in the casing and tangential to the worm wheel; a worm carried at an intermediate point of the worm shaft and cooperative with the worm wheel; a ball formed on the worm shaft near one end thereof and mounted in a socket carried by the casing, about which ball the shaft can swing to disengage the worm from the worm wheel; a plunger slidably mounted in a guideway in the casing and coaxial with the worm shaft, in which plunger is formed a bore inclined obliquely to the worm shaft and into which extends that end of the worm shaft remote from the ball whereby inward movement of the plunger into the casing is operative to disengage the worm from the worm wheel; a coaxial cavity in the outer end of the plunger remote from the bore containing the end of the worm shaft; a closure plug screwed into the outer end of said cavity; a pin, fixed to the casing, in the wall of the guideway and extending radially inward through a longitudinal slot formed in the wall of the cavity; a spring within the cavity extending, in compression, between the closure plug and the said pin to urge the plunger outwardly of the casing whereby the worm is urged into engagement with the worm wheel by wedge action of that part of the plunger lying between the worm shaft and the surface of the guideway remote from the worm wheel.

17. A sighting device as claimed in claim 16 having a pair of longitudinal shoulders constituted by the edges of a longitudinal groove formed in the inner surface of the bore in the casing wherein the carrier is mounted, the carrier being of slightly smaller diameter than said bore whereby it makes contact with the bore only along said shoulders, a third support being provided by the engagement between worm and worm wheel.

18. A sighting device as claimed in claim 1 having a carrier rotatably mounted in a cylindrical bore in the mounting; a sighting instrument mounted in a central bore in said carrier and constituting, with said carrier, the said rotatable unit upon which the rotary adjustment operates; a ball mounting near one end of the carrier, through which the sighting instrument is mounted in the carrier; and an additional adjustment mechanism for turning the sighting instrument about the ball mounting to adjust the line of sight, which additional adjustment mechanism comprises a pair of sliding cam arrangements mounted in the carrier, longitudinally spaced along the sighting instrument near the end of the carrier remote from the ball mounting and operative upon the sighting instrument in two perpendicular diametral directions; each arrangement comprising a pair of cam plungers slidably mounted in cylindrical, transverse, guide bores in the carrier, one on either side of the sighting instrument and intersecting the central bore of the carrier; a cam face on each plunger, inclined to the axis thereof and forming part of the surface of a cutaway portion of the plunger in which the sighting instrument engages, the cam faces on the two cam plungers of the pair being parallel and engaging the sighting instrument at opposite ends of a diameter, whereby the movement of the plungers in unison along their guide bores is operable to rotate the sighting instrument about the ball mounting in a plane perpendicular to the cam faces; a lever linking adjacent ends of the pair of cam plungers and pivoted to each; a screw adjustment operable on the mid point of said lever to move it in a direction parellel to the plunger axes to move the plungers in unison along their guide bores; a head portion to said screw adjustment, caged in the carrier to prevent longitudinal movement of the screw relative to the carrier and to form a fulcrum for the lever; and a spring, housed in a recess in the carrier and operable axially upon one plunger and, through the lever, upon the second plunger of the pair, to bias the cam faces into engagement with the sighting instrument.

References Cited

UNITED STATES PATENTS

| | | | |
|---|---|---|---|
| 1,134,388 | 4/1915 | Kollmorgen | 88—32 |
| 1,953,804 | 4/1934 | Hayes | 33—69 |
| 2,578,130 | 12/1951 | Ford | 33—50 |
| 3,175,421 | 3/1965 | Watson | 74—405 X |

FOREIGN PATENTS

| | | |
|---|---|---|
| 753,788 | 8/1956 | Great Britain. |

LEONARD FORMAN, *Primary Examiner.*

J. M. FREED, *Assistant Examiner.*